United States Patent [19]

Leonardo

[11] Patent Number: 5,016,765
[45] Date of Patent: May 21, 1991

[54] MODULAR FRAME ASSEMBLY AND METHOD FOR MAKING SAME

[76] Inventor: Stephen V. Leonardo, 1128 Blanchard St., Downers Grove, Ill. 60515

[21] Appl. No.: 397,115

[22] Filed: Aug. 23, 1989

[51] Int. Cl.⁵ .............................................. A47F 5/00
[52] U.S. Cl. .................................. 211/189; 211/182; 211/194; 403/271
[58] Field of Search ............... 211/189, 192, 194, 186; 403/271, 272, 108, 190; 256/59, 65

[56] References Cited

U.S. PATENT DOCUMENTS

| | | | |
|---|---|---|---|
| 2,387,154 | 10/1945 | Kalwitz | 403/272 X |
| 3,336,004 | 8/1967 | Edie et al. | 256/65 |
| 3,787,033 | 1/1974 | Snyder et al. | 256/59 |
| 3,848,747 | 11/1974 | Thompson | 211/194 |
| 4,126,288 | 11/1978 | DeSisto et al. | 211/182 X |
| 4,238,117 | 12/1980 | Newman | 403/271 X |
| 4,419,938 | 12/1983 | Kaut | 211/182 X |

*Primary Examiner*—Robert W. Gibson, Jr.
*Attorney, Agent, or Firm*—John C. Shepard

[57] ABSTRACT

A frame assembly made from modular components includes a first frame member, a tubular post member with a work opening in its side wall to permit the post interior to be fixed to the frame exterior, and a second frame member axially mountable over the post. A spring button extending through aligned apertures in the tubular post and second frame members releasably locks the second frame member to the post. A method for constructing a product from a frame assembly includes defining a work opening in a tubular post wall, fixing the post interior to the exterior of a frame member by working through the opening, mounting a tubular frame member axially onto the post and releasably locking it to the post by way of a spring button positioned within the post. A stand made from the frame assembly may include lower and upper frame subassemblies joined by tubular column members extending between the subassemblies and onto respective opposed lower and upper tubular posts attached thereto.

15 Claims, 3 Drawing Sheets

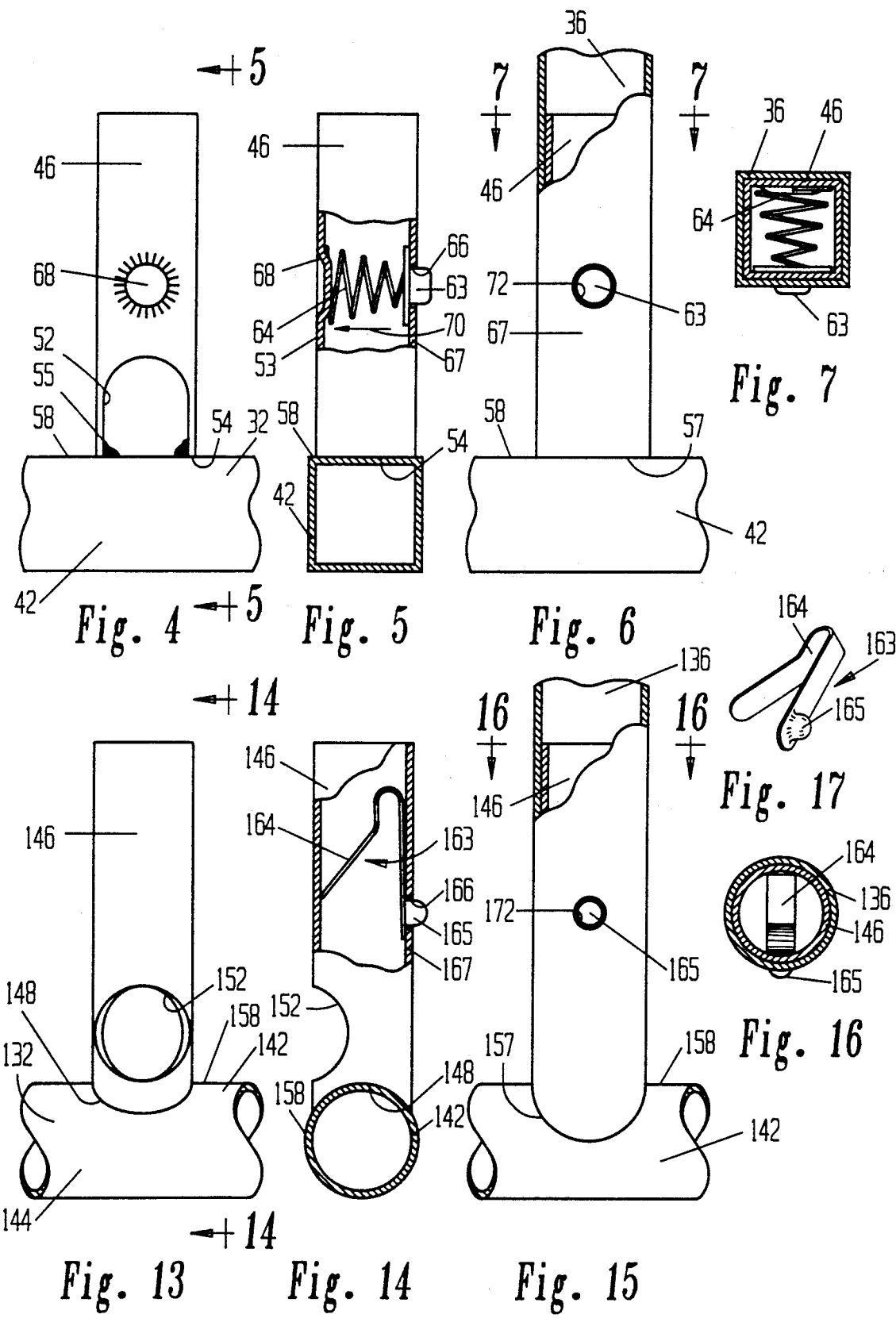

MODULAR FRAME ASSEMBLY AND METHOD FOR MAKING SAME

BACKGROUND OF THE INVENTION

1. Technical Field

This invention relates generally to modular furniture and, more particularly, to a modular frame assembly and method for making same.

2. Background Art

The production of tubular metal furniture, such as shelving, stands, racks and the like, is well known and desirable. Tubular furniture of this type is strong and light and can be aesthetically pleasing when made of chrome, polished aluminum or similar material.

However, the manufacture of such furniture presents a number of problems. Presently, most of these items are constructed from relatively large pieces of round or square tubing which are permanently assembled, as by welding, at the factory. After the pieces are fixed together, the manufacturer will clean or buff the joints between the parts to provide a suitable appearance. Thereafter, the manufacturer will apply some sort of finish to the product as by plating, painting or polishing. Since the unit must be cleaned and finished as a complete unit, the finishing process is not easily accomplished, particularly, where the assembled unit is relatively complex. Further, this method of construction does not allow the product to be disassembled for shipping, does not allow the product to be easily packed in boxes, and does not allow the manufacturer or the end user to customize the product for a particular customer's order or for a special use.

SUMMARY OF THE INVENTION

The present invention is directed to overcoming one or more of the problems as set forth above.

The present invention relates to a modular frame assembly which may be assembled from separate modules to construct an item, such as a stand. Each module includes a frame subassembly defined by a main frame member, one or more tubular post members, and one or more additional tubular frame member mounted on its respective post member. One end of the post member is attached internally to the exterior of the main frame member. Access to the interior of the post member is obtained by means of a work opening defined in the side wall of the post member adjacent the attaching end. Each member can be manufactured, finished and shipped separately as necessary and custom assembled from common material into a final product as desired.

In an exemplary embodiment, a spring-loaded button is disposed within the post member and extends through aligned apertures in the post member and the tubular frame member so that when the frame member is placed over the post member, they are releasably locked together. The spring button allows the unit to be assembled and disassembled without the use of any tools.

In another embodiment, the frame and post members comprise common round tube with the external diameter of the post member being slightly smaller than the internal diameter of the optional frame member which is axially disposed thereon and the connected end of each of the post members being concave to conform to the exterior of the frame member. Herein, the work opening is cut in the side wall at a location spaced slightly from the attaching end.

In yet another embodiment, the frame and post members comprise common square tube with the post being smaller than the frame member and having a work opening cut in its side wall along its attaching end.

The method of constructing and assembling the frame subassemblies includes defining a work opening in a tubular post wall, fixing the post interior to the exterior of a first frame member by working through the opening, mounting a second tubular frame member axially onto the post and releasably locking it to the post by way of a spring button or similar method carried by the post. A complete unit or assembly is constructed by adding additional tubular posts and frame members.

In one embodiment of an item made from the frame assembly in accordance with the method, a stand defines a shelving unit comprised primarily of an open frame, shelf supports, and an optional flat shelf. The shelving unit frames are provided with vertical tubular posts which extend into the ends of the columns, which are also tubular, so as to connect the shelving units together. The height of the overall stand and the spacing between the individual shelves can be adjusted by using different lengths of supporting columns between the shelf frames. The number of shelves can be varied by modifying the number of selected shelf subassemblies.

BRIEF DESCRIPTION OF THE DRAWINGS

The details of construction and operation of the invention are more fully described with reference to the accompanying drawings which form a part hereof and in which like reference numerals refer to like numerals throughout.

In the drawings:

FIG. 4 is an enlarged, partial, front elevational view of a tubular post fixed to the shelf frame of the stand shown in FIG. 1;

FIG. 5 is an enlarged, vertical cross-sectional view, partially in section, taken along line 5—5 of FIG. 4;

FIG. 6 is an enlarged, rear elevational view of the frame post, partially in section, showing the tubular vertical column placed over the frame post;

FIG. 7 is an enlarged, horizontal cross-sectional view of the shelf frame taken along line 7—7 of FIG. 6;

FIG. 13 is an enlarged, partial, front elevational view of a tubular frame post fixed to the shelf frame of the stand shown in FIG 8;

FIG. 14 is an enlarged, vertical cross-sectional view, partially in section, taken along line 14-14 of FIG. 13;

FIG. 15 is an enlarged, rear elevational view of the post, partially in section, showing the tubular vertical column placed over the frame post;

FIG. 16 is an enlarged, horizontal cross-sectional view of the shelf frame taken along line 16—16 of FIG. 15; and, FIG. 17 is a perspective view of the spring snap button used in the FIGS. 14 through 16.

DESCRIPTION OF THE PREFERRED EMBODIMENTS

Figures 1, 2, 3:
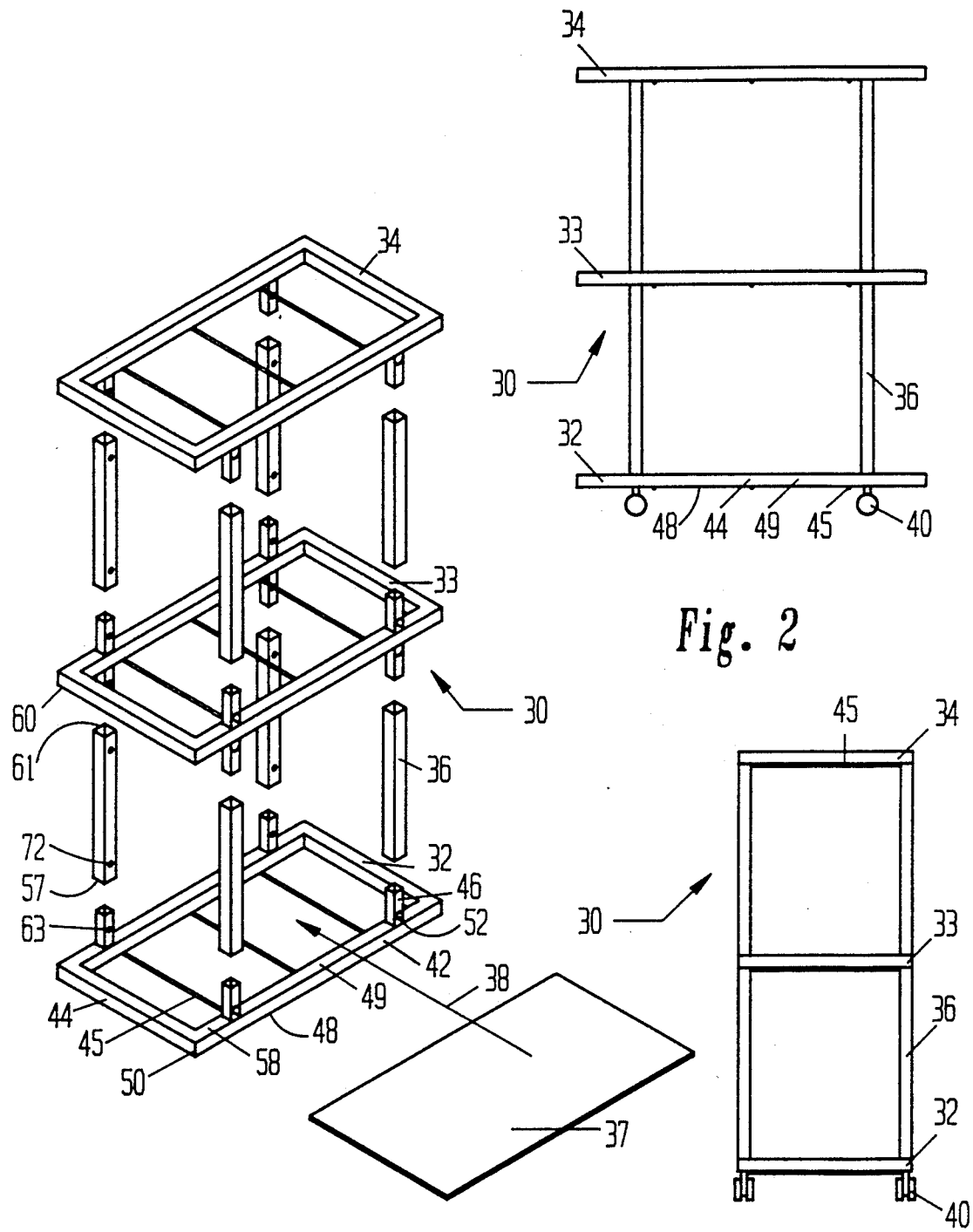
FIG. 1 is an exploded, perspective view of a first embodiment of a modular stand formed from square tubing and having three shelves.
FIG. 2 is a front elevational view of the assembled stand shown in FIG. 1.
FIG. 3 is a side elevational view of the assembled stand shown in FIG. 1.
Figure 8:
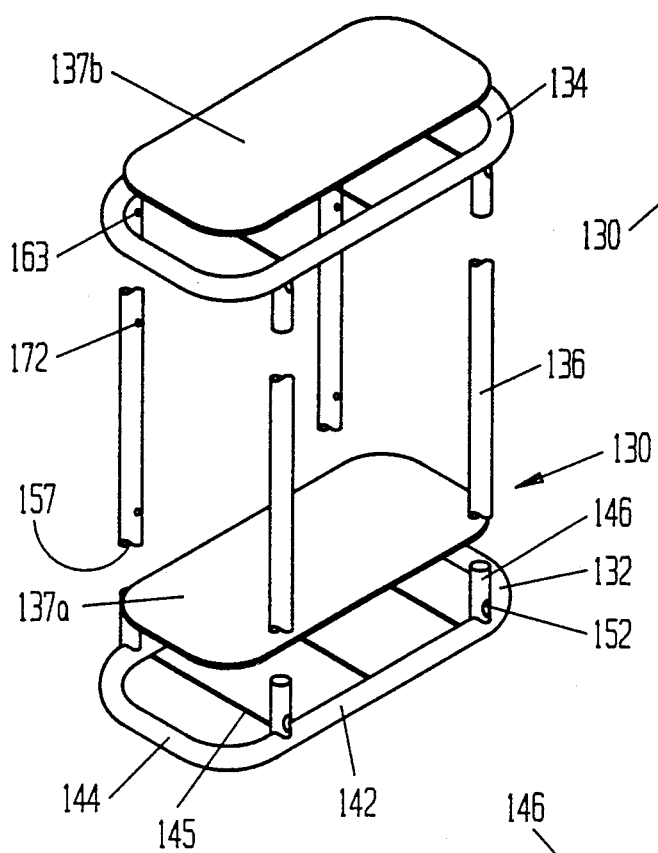
FIG. 8 is an exploded, perspective view of a second embodiment of a modular stand formed from round tubing and having two shelves.
Figure 9:
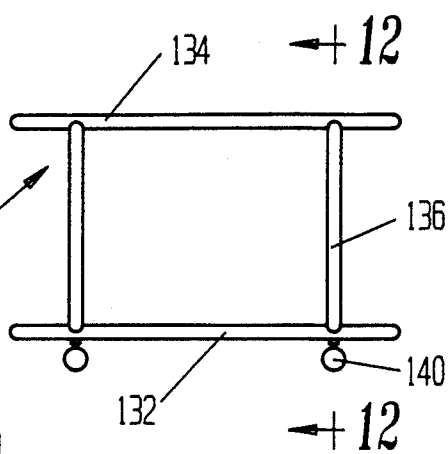
FIG. 9 is a front, elevational view of the assembled stand shown in FIG. 8.
Figure 10:
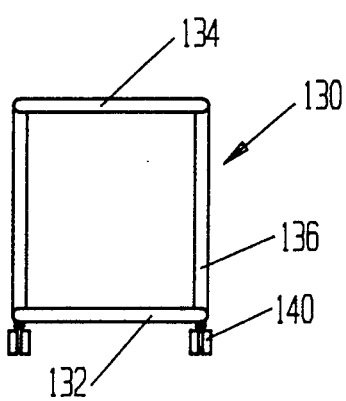
FIG. 10 is a side, elevational view of the assembled stand shown in FIG. 8.

Best Modes for Carrying Out the Invention

The modular assembly disclosed herein can be best understood from a description of an item made from the modular components thereof. Referring to FIGS. 1 through 7 of the drawings, a modular stand assembly, generally designated 30, includes a lower frame subassembly 32, an optional intermediate frame subassembly 33, an upper frame subassembly 34, and a plurality of upright frame members, or columns, collectively designated 36, between adjacent subassemblies 32-34. The frame subassemblies 32-34 and columns 36 may be constructed of square tube formed from steel or other metal for strength and rigidity. Each frame subassembly 32-34 defines a supporting platform unit for items such as the optional flat shelf 37, which is located on the platform as indicated by the arrow 38 in FIG. 1. The base of the stand 30 is provided with casters 40 so that the stand 30 can be moved easily across a floor (not shown).

Each of the shelf frame subassemblies 32-34 is constructed similarly. For example, the lower frame subassembly 32 is comprised of a single tube 42 bent to form a open outer frame 44, wire supports 45 extending across the horizontal open frame 44, and a plurality of short vertically extending tubular studs, or posts, collectively designated 46, fixed to the frame 44. As shown herein, the outer frame 44 is rectangular in shape and the horizontal wires 45 are welded to the underside 48 of the long sides 49 of the frame 44 with the upper surfaces of the wires 45 supporting the shelf 37 or any other item placed thereon. In the embodiment shown herein, there are four vertical posts 46 extending perpendicularly from the frame subassembly 32. A pair of posts 46 are located along each long side 49 of the tubular frame 44 with one adjacent each of the frame corners 50. Note that the upper subassembly 34 has downwardly extending posts 46 and that the intermediate subassembly 33 has upwardly extending as well as downwardly extending posts 46.

To provide a clean external joint and to assist in the manufacture of the frame subassemblies 32-34, the vertical posts 46 are provided with a cut work opening 52 through the outwardly exposed side wall 53 at its squared-off fixed end 54 so that the tubular posts 46 may be fixed internally as by welds 55 onto the exterior of the tube frame 44 as seen in FIG. 4. Since the welds 55 are made on the inside of the tubular posts 46, the welds 55 are concealed and do not interfere with the placement of the columns 36 over the posts 46.

The tubes forming the open frames 32-34 and columns 36 have the same outer diameter so that the stand 30 when assembled appears to be constructed of similarly sized elements. The tubes forming the posts 46 have an outer diameter nearly equal to, but slightly smaller than, the inner diameter of the columns 36 so that the tubular columns 36 may be inserted onto the vertical posts 46 as best seen in FIGS. 6 and 7. A typical size for the frame and column tubes 42 and 36, respectively, is 1 inch square with 1/16 inch thick walls and typical post tube sizes are ⅞ inch square with 1/16 inch thick walls. The posts 46 are approximately 3 inches in height and the columns 36 may vary as necessary for desired shelf spacing.

When fully assembled, the openings 52 in the vertical posts 46 are completely covered by the columns 36 so that they are concealed from view. Further, the squared-off lower end 57 of the vertical columns 36 rest on the flat upper surface 58 of the frame subassembly 32 (or 33) disposed immediately below as best seen in FIGS. 2, 3 and 6. Similarly, the flat lower surface 60 of the frame subassembly 33 (or 34) disposed immediately above rests on the squared-off upper end 61 of the columns 36 as seen in FIGS. 2 and 3.

To releasably lock the respective vertical posts 46 and columns 36 together, a button 63 loaded by a small conical spiral spring 64 is disposed within the vertical post 46 and extends through an aperture 66 in the side wall 67 of the vertical post 46. The location of the spring 64 within the post 46 is maintained by the internal protuberance 68 defined in the post 46 which extends into the bottom of the spring 64 and the top of the spring 64 which extends into the base of the hollow button 63. When the vertical column 36 is moved over the vertical post 46, the button 63 is pressed internally into the vertical post 46 as indicated by the arrow 70. When the column 36 is properly located in alignment over the post 46, the button 63 will be urged outwardly through a corresponding aperture 72 in the vertical column 36 to lock the column 36 and post 46 together. Note that the buttons 63 merely prevent the stand 30 from being accidentally pulled apart and do not support any of the weight of the stand 30, since the frame subassemblies 32-34 physically contact the ends 57 and 61 of the vertical columns 36 so that the columns 36 handle the weight of the stand 30 and any objects placed thereon.

It should be apparent that the unit can be also be constructed with no intermediate parts 33 to provide only two shelves, or the unit can be provided with two or more intermediate frame parts 33 to provide four or more shelves as may be desired.

As seen in FIGS. 8 through 17, a modular stand assembly can also be constructed with round tube. A modular stand assembly, generally designated 130, includes a lower frame subassembly 132, an upper frame subassembly 134, a plurality of upright columns, collectively designated 136, between the vertically adjacent subassemblies 130-132, and a pair of optional shelves 137a and 137b. The stand 130 is provided with casters 140 which have caster stems 180 extending into plastic sockets 181 which, in turn, have been inserted snugly into bores 182 defined through the tube 142 forming the lower frame unit 132.

Figures 11, 12:
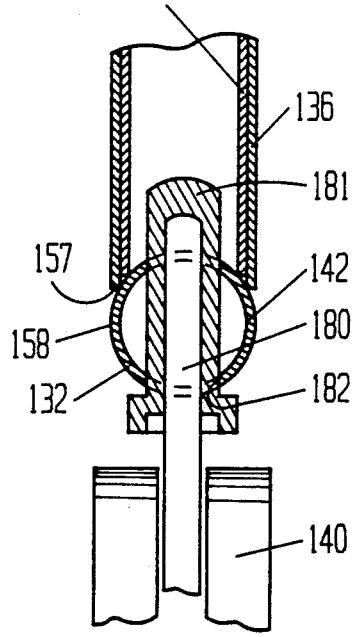
FIG. 11 is an enlarged, perspective view of the tubular post.
FIG. 12 is an enlarged, vertical cross-sectional view of the caster assembly of the stand taken along line 12—12 of FIG. 9.

As with the previously described square tube construction, the open frame subassembly 132 is made of a single round tube 142 bent to form a curvilinear open frame 144 with wire supports 145 for holding the shelves 137a and 137b. Herein, the upright posts 146 are configured to be securable to the round frame tube 142. As best seen in FIGS. 11 and 14, the configuration of the fixed ends 148 of the tubular posts 146 are concave to conform to the round exterior of the frame tube 142 to which it is welded. A round opening 152 spaced from the post concave end 148 is cut in the outward side wall of the round tube post 146 so that the post 146 may be welded internally to the exterior of the frame tube 142.

The tubes forming the posts 146 have an outer diameter nearly equal to, but slightly smaller than, the inner diameter of the columns 136 so that the tubular columns 136 may be inserted onto the vertical posts 146 as best seen in FIGS. 12, 15 and 16. Herein, the frame and column tubes 142 and 136, respectively, have a 1 inch exterior diameter and a ⅞ inch interior diameter, and the post tube 146 has a ⅞ inch exterior diameter.

When fully assembled, the openings 152 in the vertical posts 146 are completely covered by the vertical columns 136 so that they are concealed. Further, the concave ends 157 of the vertical columns 136 rest on the curved exterior surface 158 of the frame tube 142 as seen in FIG. 12.

Referring to FIGS. 14 through 17, the posts 146 and columns 136 are locked together by a spring snap button, generally designated 163, positioned within the post 146. The snap button 163 is made of spring steel which defines a generally U-shaped leg portion 164 and a button head portion 165. The spring action of the leg portion 164 pressed together within the post tube 146 urges the button head portion 165 through an aperture 166 in the side wall 167 of the vertical post 146. When the vertical column 136 is moved over the vertical post 146, the button head portion 165 is depressed and when the column 136 is properly located over the post 146, the button head portion 165 will extend outwardly through an aperture 172 in the vertical column 136 to lock the column 136 and post 146 together.

It is understood that the round tube stand 130 may have multiple intermediate shelves (not shown) as desired.

Industrial Applicability

From the foregoing, it should be apparent that many different products and items can be easily assembled and disassembled using the modular concepts disclosed herein. Further, where inventory levels are a concern, it can be appreciated that final product herein described can be constructed by choosing from a supply of variously sized, inexpensive common material rather than from a supply of more expensive finished product. It should also be apparent that small modules can be finished more easily than completed units.

Other aspects, objects and advantages of this invention can be obtained from a study of the drawings, the disclosure and the appended claims.

What is claimed is:

1. A frame subassembly made from modular components comprising:
   a first frame member;
   a tubular post member extending outwardly from said first frame member and having a side wall;
   said post member having an opening through its side wall adjacent one end thereof;
   means within said post member accessible through said opening for fixing the interior of said one end of said post member to the exterior of said first frame member;
   resilient means disposed within said post member having a portion extending through an aperture defined in said side wall; and,
   a tubular frame member movable onto said post member and having a side wall defining an aperture adapted to receive the extending portion of said resilient means, whereby the tubular frame member is releasably mounted to the post member and thereby attached to the first frame member.

2. The subassembly of claim 1 wherein said opening in said post member is spaced from said one end.

3. The subassembly of claim 1 wherein said modular members are made of round tubing and said opening in said post member is spaced from said one end.

4. The subassembly of claim 3 wherein said one end of said post member and the mountable end of said tubular frame member are concave to correspond with the convex outer surface of said first frame member.

5. The subassembly of claim 1 wherein said opening in said post member is defined along said one end.

6. The subassembly of claim 1 wherein said modular members are made from square tubing and said opening in said post member is defined along said one end.

7. The subassembly of claim 1 wherein said tubular frame member is made from tubing with a preselected internal diameter and said post member is made from tubing having an external diameter slightly smaller than said tubular frame member internal diameter so that said tubular frame member may be axially telescoped onto said post member.

8. The subassembly of claim 1 wherein said resilient means is a spring button having a button portion movable within said post member aperture and a spring portion within said post member urging the button portion outwardly therefrom.

9. The subassembly of claim 8 wherein a protuberance is defined by said post member side wall, said protuberance maintaining the position of said spring within said post member.

10. A stand assembly made from subassemblies as defined in claim 1 wherein the stand includes a lower frame subassembly having an outer frame member with upwardly extending post members, additional vertical frame members having lower ends axially disposed over said post members to function as supporting columns, and an upper frame subassembly having an outer frame member with downwardly extending post members axially disposed within the upper ends of said vertical frame members.

11. A frame subassembly made from modular metal components comprising:
   a first frame member;
   a tubular post member extending outwardly from said first frame member and having a side wall;
   said post member having an opening through its side wall adjacent one end thereof, said one end having a configuration conforming to the exterior of said first frame member;
   weld means within said post member accessible through said opening for fixedly securing the interior of said one end of said post member to the exterior of said first frame member;
   a spring button disposed within said post member having a button portion movable within an aperture defined in said side wall and a spring portion within said post member urging the button portion outwardly through said aperture; and,
   a tubular frame member having an internal diameter slightly larger than the external diameter of said post member so that it may axially telescoped onto said post member, said tubular frame member having a side wall defining an aperture adapted to receive the button portion of said spring button, whereby the respective apertures of said post member and tubular frame member may be axially and radially aligned one over the other so that said spring button will span both apertures to releasably lock the two members together.

12. A method of constructing a modular frame from two or more component members comprising:
   defining a work opening in the side wall of a tubular post member;
   attaching said post member to a first component frame member by fixedly securing the interior of said post member to the exterior of said first frame member by operating through said work opening;
   moving a tubular component frame member over said post member;
   releasably locking said tubular frame member to said post member and hence to said first frame member; and,
   releasably mounting additional optional tubular component frame members on post members fixed to respective component frame members until a complete frame assembly is constructed.

13. The method of claim 12 further including
   positioning a lock button internally within said post member prior to moving said tubular frame member over said post member with a portion of said button being resiliently urged outwardly from said post member through an aperture defined in said post member side wall; and,
   aligning an aperture in said tubular frame member with said button so that said button engages said second aperture to thereby releasably lock said tubular frame member to said post member.

14. The method of claim 12 wherein said component members are made of metal and said post and first frame members are welded together 15. A method of constructing a modular frame from two or more metal component members comprising:
   defining a work opening in the side wall of a tubular post member adjacent one end thereof;
   attaching said one end of said post member to a first frame component member by welding the interior of said post member to the exterior of said first frame member by operating through said work opening;
   positioning a lock button internally within said post member with a portion of said button being resiliently urged outwardly from said post member through an aperture defined in said post member side wall;
   moving a tubular frame component member having an internal diameter slightly larger than the external diameter of said post member axially onto said post member;
   aligning an aperture defined in the side wall of said tubular frame member with said button so that said button engages said second aperture to thereby releasably lock said tubular frame member to said post member and hence to said first frame member; and,
   releasably mounting additional optional frame component members on post members fixed to respective frame component members until a complete frame assembly is constructed.

* * * * *